F. HOTTINGER.
CHUCK.
APPLICATION FILED AUG. 24, 1917.
1,263,894.
Patented Apr. 23, 1918.
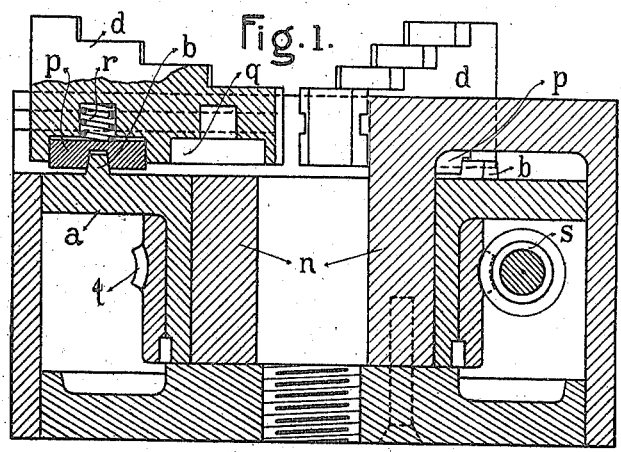
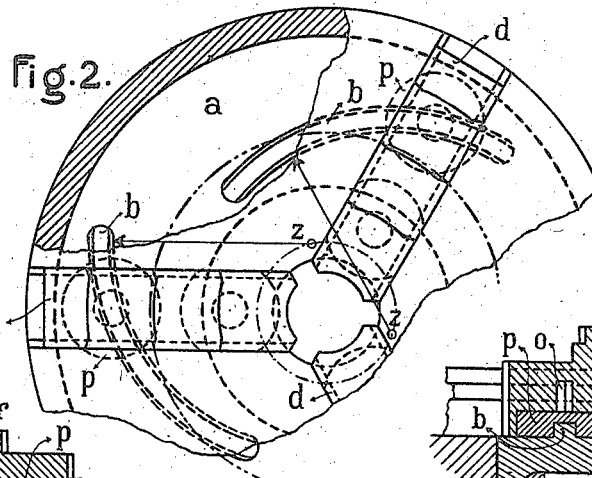
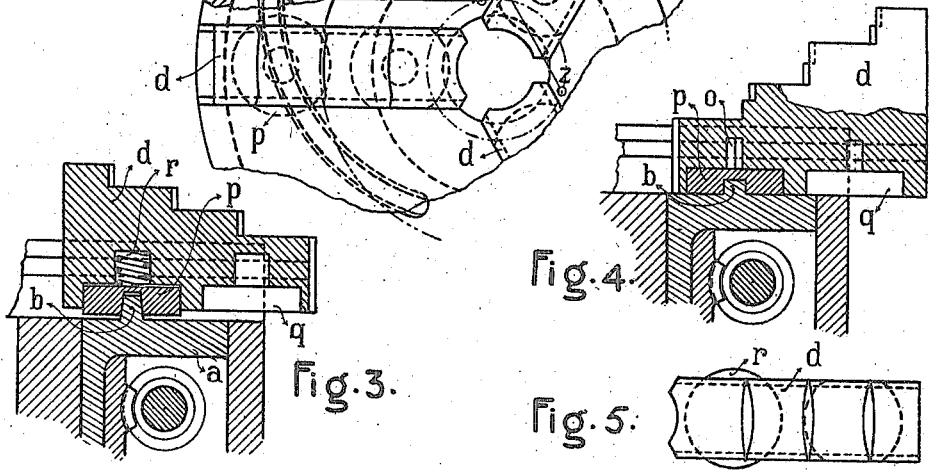
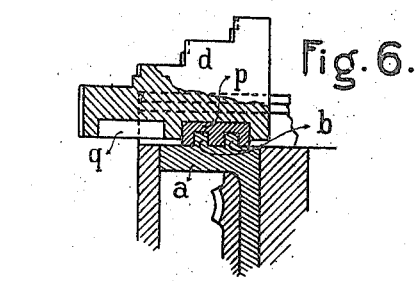
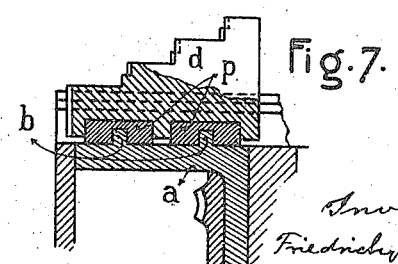
Inventor:
Friedrich Hottinger
by his attorney
Frank v. Briesen

UNITED STATES PATENT OFFICE.

FRIEDRICH HOTTINGER, OF ARLESHEIM, NEAR BASEL, SWITZERLAND.

CHUCK.

1,263,894.

Specification of Letters Patent.

Patented Apr. 23, 1918.

Application filed August 24, 1917. Serial No. 188,001.

*To all whom it may concern:*

Be it known that I, FRIEDRICH HOTTINGER, a citizen of the Swiss Republic, residing at Arlesheim, near Basel, Switzerland, have invented new and useful Improvements in Chucks, of which the following is a specification, reference being had to the accompanying drawing.

This invention relates to a concentric chuck of the type comprising radially guided jaws that are positively viz. by compulsion actuated through a disk adapted to be rotated about the axis of the chuck, by means of eccentrically arranged circular cams that engage with circular grooves in the jaws. Chucks of this type as heretofore constructed have generally been subject to the defect that in the course for the forward movement of the jaws the transmission of pressure from the cams to the jaws has taken place only through a very small range, and that the object in view is consequently not satisfactorily effected, this being due to the fact that cams and the centers thereof move in circular paths, while the grooves with which the cams are engaged are displaced parallel to themselves, their centers being thus caused to move along a line which lies parallel to the direction in which each jaw is moved, with the result that the cams will be in complete engagement with the grooves only when the centers of their circular arcs coincide, which can happen only in one particular position of the jaws.

Now the present invention has for object to obviate this disadvantage; and to this end, according to the invention, this is effected by inserting in the rear of the jaws circular disks which are adapted to rotate and in which the grooves with which the cams are intended to engage are arranged. The rear of each jaw may be provided with several circular recesses in one or other of which the rotatable disk intended for the reception of a cam-groove may be inserted; the advantage of this arrangement being that the limit of the range within which the jaw is adjustable under the action of the cam disk may be varied in a radial direction. The stepped jaws are provided on each step with a concave and a convex gripping surface and can consequently be employed for the gripping of work-pieces or tools either from without or from within.

In the accompanying drawings, which illustrate by way of example one construction of chuck in accordance with this invention together with some detailed modifications, Figure 1 is a longitudinal section of the chuck and Fig. 2 is a front view thereof, partly in section, the jaws being adapted for gripping the work-piece externally; Fig. 3 is a longitudinal section of a single jaw such as shown in Fig. 1, its position being however reversed, as when employed for gripping a work-piece internally; while Figs. 4 and 5 are respectively a longitudinal section and a front view of a jaw of modified construction, and Figs. 6 and 7 views analogous to Fig. 3, but illustrating further modified constructions.

Referring now to the drawings:—

The cam disk $a$ is mounted to be freely rotatable on the hub $n$ of the chuck and is actuated by means of a worm $s$ meshing with the worm-wheel $t$ rigidly connected with the cam disk. The 3 cams $b$ provided on the face of the cam disk $a$ have the form of circular arcs, the centers $z$ of which are situated out of but equidistant from the central axis of the chuck, the arrangement being such as to enable the cams to displace the jaws $d$ to an extent sufficient for practical requirements. Each jaw is furnished at its rear with several recesses $q$, two such recesses being provided in the example illustrated in the drawings, and in one or the other of these recesses there is inserted a circular disk $p$ provided with a groove for the reception of the corresponding cam $b$, the curvature of the grooves being the same as that of the cams. This arrangement enables the distance of the jaws from the axis to be adjusted as, according as the disk $p$ is inserted in the inner or outer of the recesses $q$, the gripping surface of the jaw will be situated at a greater or less distance from the central axis of the chuck, from which it is obvious that the limits of the range within which the jaw is moved, when actuated by the cam disk, are adjustable.

During the radial displacement of the jaws $d$ the disks $p$ will rotate slightly within the jaws so as automatically to adjust the position of the curves of their grooves to the positions of the curves of the cams $b$, the grooves thus accommodating themselves to the cams throughout their entire length and in all positions.

In the construction illustrated in Figs. 1, 2 and 3 the cross-section of the cams $b$ is that of a frustrated wedge, and it is consequently necessary that the grooves in the disk $p$ should be somewhat narrower at their bases than at the surface of the disk in proximity to the cam disk $a$, this construction obviating the risk of gripping or binding of the cams in the grooves. The disks $p$, as shown, are pressed toward the cam disk by means of springs $r$ lodged in the jaws; but for these springs there may be substituted other adjusting devices, such for instance as set-screws.

Corresponding to each jaw there may in some instances be provided on one and the same cam disk $a$, as illustrated in Figs. 6 and 7, several concentrically arranged cams $b$ in order as far as possible to increase the contact surfaces, and in this case either each disk $p$ may be provided with a corresponding number of concentric grooves for the reception of the cams, as shown in Figs. 6, or each jaw may be furnished with several disks $p$ each provided with a groove for the reception of one of the cams, as shown in Fig. 7.

The stepped jaws $d$ are provided on each of their steps with both a convex and a concave gripping surface. In the arrangement of jaw illustrated in Figs. 1 and 3 of the accompanying drawings both the gripping surfaces of each step are located at the same level and the concave surface is recessed in the convex surface, Fig. 2. This arrangement has the advantage of enabling the jaws to be used both for gripping workpieces or tools externally when in the position they occupy in Figs. 1 and 2, and also, when the jaws have been rotated through an angle of 180°, as illustrated in Fig. 3, for internally gripping and maintaining in position hollow bodies. The same remarks obviously also apply to the construction illustrated in Figs. 4 and 5, in which the concave gripping surface of each step is arranged in advance of the convex gripping surface, that is to say at a higher level in the step.

The circular disk $p$ of the jaw illustrated in Fig. 4 is provided on the opposite face to that containing the groove for the reception of the cam $b$, with a thin cylindrical split pin $o$ projecting into a hole bored in the jaw $d$; both halves of the split pin having an outward spring, so that they engage automatically with the walls of the bore for the pin, and thus maintain the disk $p$ in position when the jaw is taken away from the cam disk.

What I claim is:—

1. In a chuck, a rotatable jaw-supporting cam-disk provided with radially disposed guides, means for rotating said disk, a plurality of jaws carried by said jaw-supporting disk, adapted to engage with and to be moved in said guides, a plurality of sector-shaped rib-like cams projecting from a face of said supporting disk and eccentrically disposed relatively thereto, a circular recess at the rear of each jaw and formed in its face in proximity to said supporting disk, and a circular jaw-actuating disk that is lodged within and is rotatable in said recess, and has formed in it a sector-shaped groove the curvature of which corresponds with that of one of said cams, with which it is adapted to engage.

2. In a chuck, a rotatable jaw-supporting cam disk provided with radially disposed guides, means for rotating said disk, a plurality of jaws carried by said jaw-supporting disk, adapted to engage with and to be moved in said guides, a plurality of sector-shaped rib-like cams projecting from a face of said supporting disk and eccentrically disposed relatively thereto, a plurality of circular recesses to the rear of each jaw and formed in its face in proximity to said supporting disk and a circular jaw-actuating disk that can be lodged within and transferred from one to another of said recesses wherein it can be rotated, said jaw-actuating disk being provided with a sector-shaped groove adapted to engage with one of said rib-like cams, with which it corresponds in curvature.

3. In a chuck, a rotatable jaw-supporting cam disk provided with radially disposed guides, means for rotating said disk, a plurality of jaws carried by said jaw-supporting disk, adapted to engage with and to be moved in said guides, a plurality of sector-shaped rib-like cams projecting from a face of said supporting disk and eccentrically disposed relatively thereto, a circular recess at the rear of each jaw and formed in its face in proximity to said supporting disk, and a circular jaw-actuating disk that is lodged within and is rotatable in said recess, and has formed in it a plurality of sector-shaped grooves each adapted to engage one of said rib-like cams, the cams and grooves in engagement with each other being of corresponding curvature.

4. In a chuck, a rotatable jaw-supporting cam-disk provided with radially disposed guides, means for rotating said disk, a plurality of jaws carried by said jaw-supporting disk, adapted to engage with and to be moved in said guides, a plurality of sector-shaped rib-like cams projecting from a face of said supporting disk and eccentrically disposed relatively thereto, a circular recess at the rear of each jaw and formed in its face in proximity to said supporting disk and a circular jaw-actuating disk that is lodged within and is rotatable in said recess, and has formed in it a sector-shaped groove the curvature of which corresponds with that of one of said cams, with which it is adapted to engage, said jaws being provided with concave and convex gripping surfaces and being rotatable through an angle of 180° relatively to the supporting disk.

5. In a chuck, a rotatable jaw-supporting cam-disk provided with radially disposed guides, means for rotating said disk, a plurality of jaws carried by said jaw-supporting disk, adapted to engage with and to be moved in said guides, a plurality of sector-shaped rib-like cams projecting from a face of said supporting disk and eccentrically disposed relatively thereto, a plurality of circular recesses to the rear of each jaw and formed in its face in proximity to said supporting disk and a circular jaw-actuating disk that can be lodged within and transferred from one to another of said recesses wherein it can be rotated, said jaw-actuating disk being provided with a sector-shaped groove adapted to engage with one of said rib-like cams, with which it corresponds in curvature, said jaws being provided with concave and convex gripping surfaces and being rotatable through an angle of 180° relatively to the supporting disk.

6. In a chuck, a rotatable jaw-supporting cam-disk provided with radially disposed guides, means for rotating said disk, a plurality of jaws carried by said jaw-supporting disk, adapted to engage with and to be moved in said guides, a plurality of sector-shaped rib-like cams projecting from a face of said supporting disk and eccentrically disposed relatively thereto, a circular recess at the rear of each jaw and formed in its face in proximity to said supporting disk, and a circular jaw-actuating disk that is lodged within and is rotatable in said recess, and has formed in it a plurality of sector-shaped grooves each adapted to engage one of said rib-like cams, the cams and grooves in engagement with each other being of corresponding curvature, said jaws being provided with concave and convex gripping surfaces and being rotatable through an angle of 180° relatively to the supporting disk.

7. In a chuck, a rotatable jaw-supporting cam-disk provided with radially disposed guides, means for rotating said disk, a plurality of jaws carried by said jaw-supporting disk, adapted to engage with and to be moved in said guides, a plurality of sector-shaped rib-like cams projecting from a face of said supporting disk and eccentrically disposed relatively thereto, a circular recess at the rear of each jaw and formed in its face in proximity to said supporting disk, and a circular jaw-actuating disk that is lodged within and is rotatable in said recess, and has formed in it a sector-shaped groove the curvature of which corresponds with that of one of said cams, with which it is adapted to engage, the cams and the grooves with which they engage having in cross-section the form of a frustrated wedge.

8. In a chuck, a rotatable jaw-supporting cam-disk provided with radially disposed guides, means for rotating said disk, a plurality of jaws carried by said jaw-supporting disk, adapted to engage with and to be moved in said guides, a plurality of sector-shaped rib-like cams projecting from a face of said supporting disk and eccentrically disposed relatively thereto, a plurality of circular recesses to the rear of each jaw and formed in its face in proximity to said supporting disk and a circular jaw-actuating disk that can be lodged within and transferred from one to another of said recesses wherein it can be rotated, said jaw-actuating disk being provided with a sector-shaped groove adapted to engage with one of said rib-like cams, with which it corresponds in curvature, the cams and the grooves with which they engage having in cross-section the form of a frustrated wedge.

9. In a chuck, a rotatable jaw-supporting cam disk provided with radially disposed guides, means for rotating said disk, a plurality of jaws carried by said jaw-supporting disk, adapted to engage with and to be moved in said guides, a plurality of sector-shaped rib-like cams projecting from a face of said supporting disk and eccentrically disposed relatively thereto, a circular recess at the rear of each jaw and formed in its face in proximity to said supporting disk, and a circular jaw-actuating disk that is lodged within and is rotatable in said recess, and has formed in it a plurality of sector-shaped grooves each adapted to engage one of said rib-like cams, the cams and grooves in engagement with each other being of corresponding curvature, the cams and the grooves with which they engage having in cross-section the form of a frustrated wedge.

10. In a chuck, a rotatable jaw-supporting cam disk provided with radially disposed guides, means for rotating said disk, a plurality of jaws carried by said jaw-supporting disk adapted to engage with and to be moved in said guides, a plurality of sector-shaped rib-like cams projecting from a face of said supporting disk and eccentrically disposed relatively thereto, a circular recess at the rear of each jaw and formed in its face in proximity to said supporting disk, and a circular jaw-actuating disk that is lodged within and is rotatable in said recess, and has formed in it a sector-shaped groove the curvature of which corresponds with that of one of said cams, with which it is adapted to engage, means being moreover provided for pressing said rotatable jaw-actuating disks toward said jaw-supporting disk.

11. In a chuck, a rotatable jaw-supporting cam-disk provided with radially disposed guides, means for rotating said disk, a plurality of jaws carried by said jaw-supporting disk, adapted to engage with and to be moved in said guides, a plurality of sector-shaped rib-like cams projecting from a face of said supporting disk and eccentrically disposed relatively thereto, a circular recess at the rear of each jaw and formed in its face in proximity to said supporting disk and a circular jaw-actuating disk that is lodged within and is rotatable in said recess, and has formed in it a sector-shaped groove the curvature of which corresponds with that of one of said cams, with which it is adapted to engage, spring devices being moreover provided for pressing said rotatable jaw-actuating disks toward said jaw-supporting disk.

12. In a chuck, a rotatable jaw-supporting cam-disk provided with radially disposed guides, means for rotating said disk, a plurality of jaws carried by said jaw-supporting disk, adapted to engage with and to be moved in said guides, a plurality of sector-shaped rib-like cams projecting from a face of said supporting disk and eccentrically disposed relatively thereto, a plurality of circular recesses to the rear of each jaw and formed in its face in proximity to said supporting disk and a circular jaw-actuating disk that can be lodged within and transferred from one to another of said recesses wherein it can be rotated, said jaw-actuating disk being provided with a sector-shaped groove adapted to engage with one of said rib-like cams, with which it corresponds in curvature, spring devices being moreover provided for pressing said rotatable jaw-actuating disks toward said jaw-supporting disk.

In testimony thereof I affix my signature in the presence of two witnesses.

FRIEDRICH HOTTINGER.

Witnesses:
  FRIDA SALADIN,
  E, R. LAMBICH.

Copies of this patent may be obtained for five cents each, by addressing the "Commissioner of Patents, Washington, D. C."